May 22, 1956     E. C. GREANIAS ET AL     2,746,286
APPARATUS FOR AUTOMATIC FLASH POINT TESTING
Filed March 9, 1951     3 Sheets-Sheet 1

INVENTORS:
EVON C. GREANIAS
ROBERT B. JACOBS
BY: *Everett A. Johnson*
ATTORNEY:

May 22, 1956     E. C. GREANIAS ET AL     2,746,286
APPARATUS FOR AUTOMATIC FLASH POINT TESTING
Filed March 9, 1951     3 Sheets-Sheet 2

INVENTORS:
EVON C. GREANIAS
ROBERT B. JACOBS
BY:
Everett A. Johnson
ATTORNEY:

United States Patent Office 2,746,286
Patented May 22, 1956

2,746,286

APPARATUS FOR AUTOMATIC FLASH POINT TESTING

Evon C. Greanias, Chicago, and Robert B. Jacobs, Homewood, Ill., assignors to Standard Oil Company, Chicago, Ill., a corporation of Indiana Application March 9, 1951, Serial No. 214,802

13 Claims. (Cl. 73—36)

This invention relates to the determination of flash points of liquids. More specifically the invention pertains to a system for ascertaining whether a hydrocarbon sample has a flash point below a selected safe limit.

In the marketing of hydrocarbons such as furnace oils, it is important to avoid the presence of more volatile constituents. For example, it is important, when a quantity of hydrocarbon liquid has been designated as fuel oil, that there be no inadvertent substitution of a more volatile material such as gasoline. It is therefore beneficial to have a rapid means for ascertaing whether the particular sample comes within the prescribed minimum flash point specifications. However, it is not economically feasible to provide specially skilled technicians at all marketing points where the substitution or mistake could possibly occur. It is therefore a principal object of this invention to provide an apparatus which is rugged and compact and which can be operated without the exercise of special skill for determining whether a particular batch of presumed fuel oil does in fact meet the flash point specifications.

Another object of our invention is to provide an electrical system and control mechanism which renders such testing apparatus foolproof with respect to inadvertent or intentional faulty operation or testing. A further object of our invention is to provide a control mechanism for an order release printer which is controllable only by a successful flash point test.

It is also desirable to obtain indications of flash points of a continuously flowing stream of liquids, as for example in a pipe line. Accordingly, an additional object of the invention is to provide an apparatus for use in monitoring flow through a pipe line. The above and other objects of our invention will become appartent as the description thereof proceeds.

By our invention we may automatically determine whether or not the flash point of a sample exceeds a fixed temperature or we may measure and indicate the exact temperature at which flashes do occur. The system can be used to indicate by means of colored light signals whether the sample has a flash point above or below some predetermined temperature such as the minimum flash point in the specification for kerosene, while modification of the system enables it to be used to indicate and/or record the actual flash point of the sample being tested.

In either operation a heated liquid stream is passed into an enclosed cup provided with an overflow. A preheated stream of air is also fed into the flash chamber at a constant rate and uniform pressure. The oil and air are commingled and the combined stream flows into the flash chamber proper where a spark fires periodically between two electrodes above the liquid. An electric heater controls the temperature of the liquid or froth in the cup. When the sample temperature is high enough to flash it is ignited by the spark and this flash generates a pressure wave which is detected by the expansion of a bellows means which in turn operates a switch which controls a multiplicity of operations.

When used for the first purpose the expansion of the bellows activates a system of relays which in turn complete an electrical red-light circuit indicating that the sample has a flash point below the predetermined temperature level. A second relay integrated with a mechanical stamping device can render said device inoperative so that the operator will be unable to obtain the approval stamp required for official release of the shipment. In the event the sample is safe and no flash occurs and the bellows remain stationary for a predetermined interval of time, a green-light circuit is completed indicating that the sample has passed the test and under these conditions the stamping device is rendered operative by means of a system of relays and the operator is then able to obtain the official stamp of approval on the shipment. In this embodiment, the sample under test is heated to the predetermined temperature by a heating means such as an electrical resistance heater equipped with a thermostat.

If desired our flash point responsive device may be operated in such a manner as to indicate the exact instantaneous temperature at which the flashes occur. In this case the extension of the bellows means operates a series of relays which indicate the temperature at which the flashes occur and simultaneously reduce the input to the heating element associated with the flash chamber. The temperature of the sample at the flash is measured by means of a thermocouple or temperature-sensitive resistor in thermal contact with the sample in the flash chamber body and can be recorded on a recording potentiometer. Thus we may semi-continuously measure and record the flash point of a sample flowing through the flash chamber. After a timed interval following a flash during which the chamber is cooled, the heater and sparking devices again become operative with the heating being continued until the temperature reaches the flash point of the sample, at which time the cycle is repeated. If desired, the flow of the sample to the flash chamber may be alternated with a stream of air for the purpose of purging combustion products.

We have found that our flash points correlate with the standard ASTM methods for oils having flash points roughly in the range of 100 to 300° F. Furthermore, we have operated our constant temperature indicating devices for considerable periods of time where we can distinguish between oils having flash points which are somewhat less than one degree apart. Such precision is even better than the best ASTM methods, i. e. Tag Closed Cup and Pensky-Martens Closed Cup. In the continuous flash point measuring device, its accuracy for oils below about 250° F. is comparable to that of the ASTM methods.

When our automatic batch sampling device is employed for loading rack use, the operator simply pours his sample into the device and releases a gravity-operated piston pump. This pump introduces the sample into the flash chamber and after about two minutes times the instrument indicates whether or not the introduced sample has a satisfactory flash point.

A continuous constant temperature instrument may comprise means for introducing a small stream of oil continuously (as for example from a pipe line) into the flash chamber which is maintained at the desired level by an overflow drain. The ignition spark is maintained in operation over a pre-arranged schedule and at selected periods, for example, once per minute, a semi-continuous record or indication of the flash point of the flowing stream is obtained.

Other details of our invention and of construction of the apparatus will be apparent from the following description taken with the accompanying drawings wherein corresponding elements in several views are designated by corresponding reference characters, and wherein.

Figure 1:
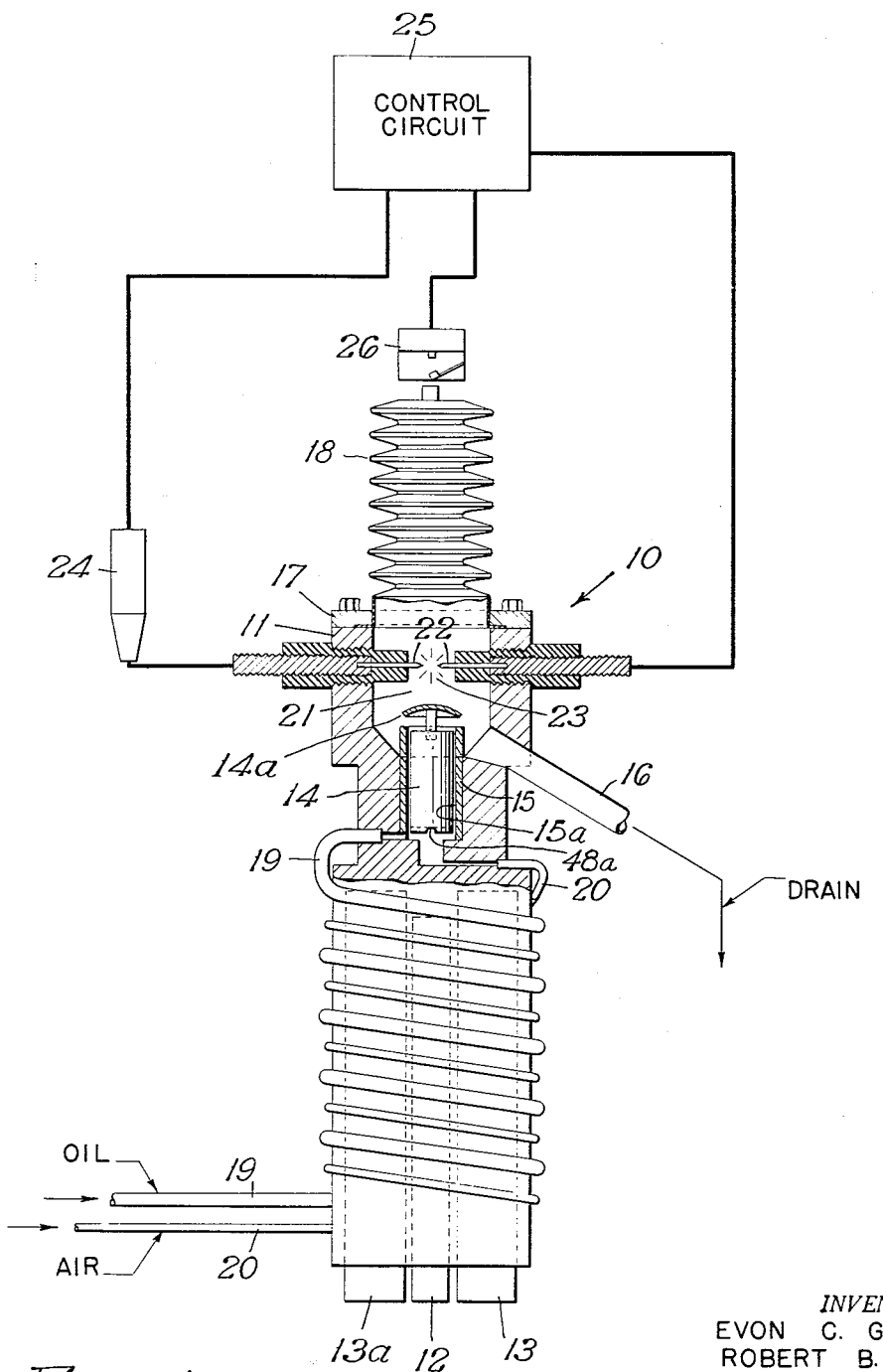
Figure 1 is a vertical section, partly in diagram, illustrating the flash chamber assembly.

Referring to the drawings, the flash unit 10 comprises an open-ended vessel 11 closed by a removable head 17 supporting a metallic bellows 18 which forms a wall of the chamber 10. In the lower part of unit 10 heat may be supplied by means of a cartridge heater 12. Such heater may, for example, be a 50-watt heater of about ⅜ inch in diameter embedded within the body of the vessel 11. A thermal switch 13 controls the temperature of the unit 10 at the desired level when the device is used as a flash tester to determine the flash point with reference to such temperature level. A sample cup 15 is centrally disposed within the vessel 11. Within the cup 15 is a displacement cylinder 14 to which is fixed a splash shield 14a to confine the sample liquid and divert it to an overflow drain 16.

The oil to be tested is preheated and introduced into the chamber 10 via line 19. This preheating may be done, for example, by winding the inlet line 19 about the thermostatted vessel 11. However, a separate preheater (not shown in Figure 1) may be provided. Similarly, preheated air is introduced by inlet feed line 20 and enters the vapor space 21 in flash chamber 10 after passing through the cup 15.

A pair of spark gap rods 22 about 1/32 inch in diameter, the tips of which are of platinum-iridium and separated by a gap 23 of about 9/64 inch, extend through insulating bushings in the walls of vessel 11 into the vapor space 21 of the chamber 10. A spark coil 24 energizes the spark gap rods 22 and the sparking coil mechanism 24 is in an electrical control circuit 25 which is in turn controlled by the bellows switch 26 actuated by the brass bellows 18. The bellows switch 26 is mounted so as to clear the lower or contracted position of the brass bellows 18 by about 0.025 inch. When a flash occurs the bellows 18 is extended, thereby closing the bellows switch 26 connected to control circuit 25. This circuit may include relay 27, a timer 28 for the spark coil 24 and an alarm or an indicating system 56.

When the device is used for actual flash point measurement, as distinguished from merely indicating whether a flash has occurred below a selected temperature level, a relay in the circuit 25 may control the recording of the temperature of the vessel 11 at the time of the flash and may also interrupt the heating of the vessel. In such an arrangement the thermal switch 13 is not used, the heater 12 being controlled by the bellows switch. Other and specific operations will be described in greater detail hereinafter.

Figure 2:
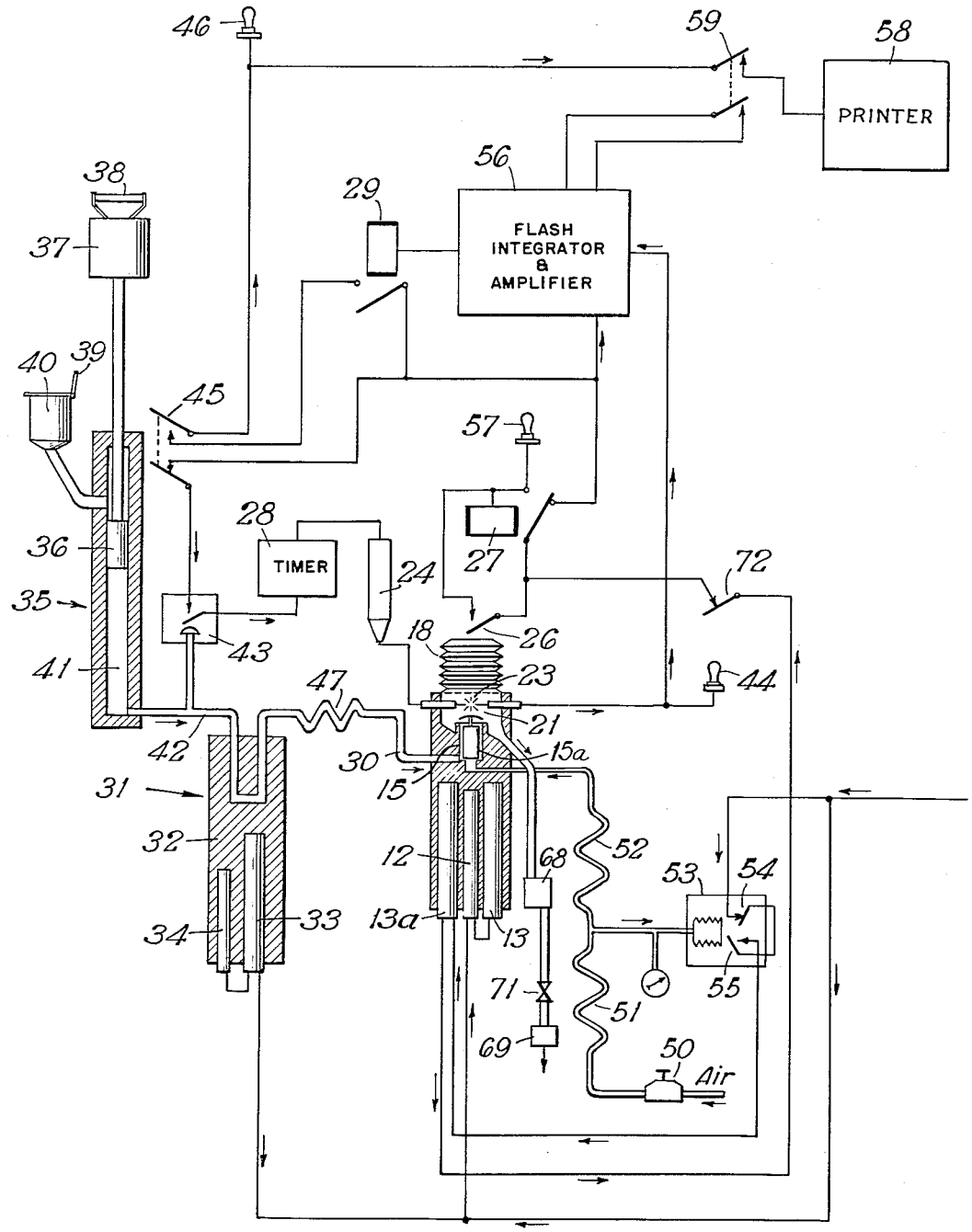
Figure 2 is a diagrammatic showing of the flow and electrical circuits used with the flash chamber of Figure 1 incorporated in a loading rack apparatus.

Referring to Figure 2, the flash chamber 10 is provided with cartridge heater 12, thermal switch 13, thermal switch 13a, bellows 18, cup 15 and bellows switch 26. The liquid sample is introduced via line 30 after being preheated in auxiliary heater 31 which comprises a block 32, a thermostat 33 and a cartridge heater unit 34. In this auxiliary heater 31 the temperature of the test sample is raised to a point approximating that of the flash chamber, i. e. the approximate temperature which represents the minimum flash point for the given sample.

The oil sample is supplied to the unit by means of a piston pump 35 actuated by gravity and having a plunger or piston 36 and a weight 37. The pump 35 furnishes approximately constant pressure to supply the sample to the instrument. A suitable pump is one which has a capacity of 100 cc. and develops 26 p. s. i. The pump 35 is locked with the weight 37 in its uppermost position by giving the handle 38 a 90° turn. In its lower position 37a the weight 37 prevents hinged cover 39 from being lifted.

Air from a uniform pressure source is supplied through a reducing valve 50 via paired capillaries 51 and 52. The length of the capillaries is adjusted to pass about 1.5 cubic feet of air per hour when the head is about 7 p. s. i. Each of the capillaries may comprise about 3.5 feet copper tubing of about 0.03 inch I. D. A pressure-actuated switch 53 is controlled by a pressure tap connected between capillaries 51 and 52 and comprises two contacts 54 and 55. If the air flow is too high or too low, the power to the thermal switch, the timer 28, and sparker means 24 is interrupted and prevents a "pass" indication. Thus, if there is not the required air flow into the flash chamber 10, the entire mechanism is rendered inoperative.

The sample is introduced by covered funnel charging means 40 when the piston 36 is at its uppermost position. The gravity pump handle 38 is then released forcing the liquid from the pump chamber 41 through line 42. A sustained oil pressure in line 42, produced only by a proper sample volume from the pump 35, operates the oil line hydraulic pressure switch 43. A neon indicator 44 is provided which flashes when the ignition circuit is in operation. The pump weight 37 also operates the pump switch 45 at the end of a test and this pump switch 45 breaks the sparking circuit and also makes possible the completion of the circuit for the green light 46 if other temperature and flow conditions are satisfactory. Thus the energizing of the sparking or intermittent ignition circuit is controlled by the air flow, the thermal switch, the liquid sample pressure switch 43, and the pump switch 45.

An oil line capillary 47 determines the rate of flow of the oil sample into the flash chamber 10 from pump 35. The length of the capillary 47 is adjusted to pass 100 cc. of sample in 2.5 minutes when being forced by pump 35 under pressure of about 25 p. s. i. Thus the capillary 47 may comprise about five feet of copper tubing of about 0.03 inch I. D. The preheater 31 on the line 42 between the pump 35 and the oil line capillary 47 raises the temperature of the sample to test temperature so that it will pass through the capillary 47 at nearly the same rate and pressure.

Within cup 15 we may provide a liquid displacement cylinder 14 to which is fixed a splash shield 14a. The displacement cylinder 14 is preferably hollow but in any event provides a narrow annulus 15a within the cup 15 which is filled with the sample of liquid which becomes a froth upon admixture with air introduced by line 20. At the base of the cylinder 14 we may provide intersecting grooves or channels 48a which permit the ingress of oil from line 19 and air from line 20 into the annulus 15a surrounding the displacement cylinder 14 which rests on the bottom of cup 15. The froth formed within the annular space 15a moves upwardly and to prevent direct impingement of the finely divided oil with the spark rods 22 within the vapor space 21 is deflected by the shield 14a.

The flash chamber unit 10 maintains the incoming air and the accumulated oil sample in cup 15 at the selected test temperature. The preheated air bubbles through the oil in the cup 15 to form a froth and vapor collects above the froth in a vapor space 21 where the electric spark fires periodically across the narrow gap 23.

The timer 28 and sparker 24 in Figure 2 furnish periodic high voltage to the spark gap 23 provided by the spaced rods 22. If the spark ignites the vapor within the vapor space 21, i. e. if there is a low flash sample in the flash chamber 10, the bellows 18 is extended to close bellows switch 26. When this happens the relay 27 opens the power circuit to the flash integrator and amplifier 56 and closes the circuit including the red light 57 indicating that the particular sample does not "pass."

After a prescribed number of impulses corresponding to the number of sparks have been accumulated in the integrator 56, the relay 29 is actuated thereby closing the power circuit to the pump switch 45. However, if the required number of sparks have not occurred, the relay switch 29 remains open and it is not possible to energize the green light for a pass indication even though a flash has not occurred within the vapor space 21 of the flash unit 10.

In the event that the bellows switch 26 has been closed by the extension of the bellows 18 resulting from an explosion or flash in the chamber 10, the red light 57 is turned on automatically, the current to the ignition means is turned off by the opening of relay 27, and the current to the green light circuit 46 is broken.

The integrator 56 counts a minimum number of sparks across the ignition gap 23 and then closes a relay switch 29 supplying power through switch 45 to the green light 46 and the electric printer 58. The green light 46 will not go on and the electric printer 58 will not be energized unless (a) the bellows switch 26 remains open; (b) a sufficient number of sparks have been counted by integrator 56; and (c) all of the sample has passed out of the pump 35, i. e. the gravity pump 35 is at its lowest position and the pump switch 45 has been closed.

The electric printer 58 shown diagrammatically in Figure 2 is used to stamp a record, such as the sales ticket, when the printer switch 59 has been closed, and this switch completes the circuit only if the conditions for a green light are met. Operation of the printer 58 also resets the green light circuit for the next test.

Figure 3:
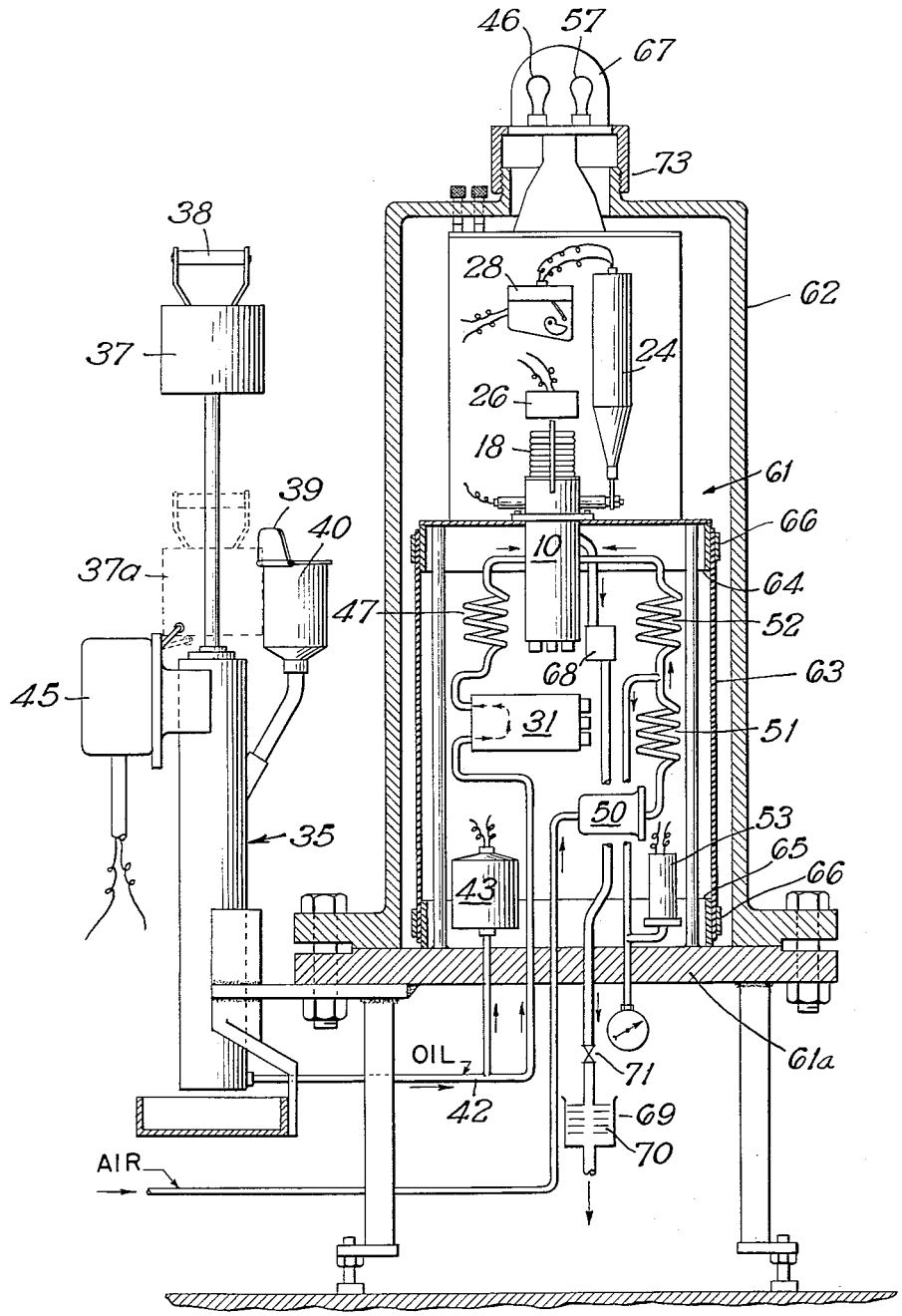
Figure 3 is an assembly view, partly in section, of the loading rack apparatus.

In Figure 3, we have illustrated elements of the device schematically shown in Figure 2 mounted on a frame member 61 having a base plate 61a. An explosion-proof housing 62 is placed over the frame 61 and the supported test mechanism. The housing 62 may be bolted at its base to the base plate 61a of the frame 61. The frame 61, enclosed within the housing 62, supports the various switches, preheater 31; capillaries 47, 51, 52; flash chamber 10; bellows 18; sparker 24; and timer 28; together with the necessary electrical indicating and circuit elements shown schematically in Figure 2. Timer 28 can be a synchronous motor-cam switch.

The intermediate portion of the frame 61 may be enclosed by a vapor-proof membrane or sleeve 63, to serve as a subhousing. The sleeve 63 may be of synthetic rubber, vapor-proof fabric or the like, and fixed to upper and lower rings 64 and 65 by means of straps or other removable retaining means 66.

For extreme temperature operations, the housing 62 may be insulated and an auxiliary heater can be provided.

The red and green lights are supported by the top portion of the frame 61 and are exposed above the housing 62 within the transparent dome 67. A threaded collar 73 vapor-seals the top of the housing 62 and base of dome 67.

In operation, the pump handle 38 is raised to its highest position and the sample is introduced into the gravity pump 35 by filler means 40 which is provided with a hinged cover 39. This cover cannot be raised when the pump handle 38 and weight 37 are in the lower position 37a shown by the broken lines. Accordingly, it is possible only to introduce a sample below the piston 36. The pump handle 38 is given a half turn and permitted to slide downwardly, the piston 36 thereby forcing the sample from the pump chamber through line 42, the preheater 31, the capillary 47 and into the cup 15. Approximately 100 cc. of the sample is satisfactory and if the entire sample has been discharged from the pump, the oil pressure switch 43, ordinarily set to operate at about 15 p. s. i., closes and energizes the timer 28 and sparker 24. Simultaneously air is introduced to the flash chamber 10 as described above.

Overflow liquid and froth from the cup 15 in the flash chamber 10 flows through a drain trap 68 and finally is withdrawn from the apparatus througs an explosion-proof drain 69, provided with a flame arrestor assembly 70. A valve 71 may be provided on line 16 and by closing this valve and introducing air into 15, the bellows 18 can be extended to test the operation of switch 26, the relay 27, and red light 57.

An ignition spark is intermittently applied to the vapor space above the cup 15 and this sparking is automatic and continuous as long as a sample is flowing if (a) the flow of air is adequate, (b) a complete oil sample has been introduced, and (c) the temperature of the flash chamber 10 is at the desired level. After the complete sample has passed through and if no flash occurred during that time, then the green light circuit becomes energized as described above, permitting the electric printer 58 to be operated. However, if a flash does occur, the bellows 18 is extended and the bellows switch 26 closed. This energizes the red light circuit and prevents the green light circuit from operating.

To conduct a succeeding test, the reset switch 72 is closed, the pump weight 37 is raised thereby opening the pump switch 45, and the cycle repeated.

Although we have described our invention by reference to specific embodiments of apparatus which are set forth in considerable detail, it should be understood that these are by way of illustration only and that our invention is not necessarily limited thereto since alternative embodiments and operating techniques coming within our invention will be apparent to those skilled in the art in view of our disclosure. Accordingly, modifications of our inventions are contemplated without departing from the spirit of the described invention or the scope of the appended claims.

We claim:

1. In a flash testing apparatus, a heated flash chamber, heating means for said chamber, a cup within a lower part of said chamber, conduit means for supplying test liquid to said chamber, an overflow from said cup, an extensible wall partially confining a vapor space above said cup, a spark ignition means within said vapor space, and electrical switch means actuated by said extensible wall to indicate the occurrence of a flash.

2. An apparatus for automatically indicating whether a liquid hydrocarbon sample has a flash point below a given temperature which includes a flash chamber, conduit means for supplying test liquid to said chamber, means for continually injecting an oxygen-containing gas into said chamber, heating means for evaporating at least a portion of said liquid sample within said flash chamber, intermittently actuated ignition means in said flash chamber, and pressure-actuated means communicating with said flash chamber adapted to indicate whether a flash has occurred within said flash chamber.

3. In a flash testing apparatus, a flash chamber means, means for maintaining said chamber at a preselected temperature, said chamber having an extensible wall portion, a cup within said chamber, liquid supply conduit means discharging upwardly into said cup, an overflow means from said cup, said chamber having a vapor space above said cup, an air feed conduit communicating with said vapor space through said cup, a spark ignition means within said vapor space, and electrical switch means actuated by said extensible wall portion to indicate the occurrence of a flash.

4. An apparatus for determining whether a sample liquid has a flash point below a selected temperature which comprises a heated flash chamber, a sample cup in said chamber, a bellows means in a wall portion of said chamber, a spark ignition means within said chamber, an electrical bellows switch actuated by said bellows means, a liquid feed inlet to said cup, means for preheating said liquid to a temperature approximating that of said heated flash chamber, a gravity pump, a funnel means for introducing the liquid sample into said pump, an air supply conduit communicating with said flash chamber, an explosion-proof housing about said flash chamber, said bellows means, and said spark ignition means, and an auxiliary circuit means responsive to said bellows switch, 5. An apparatus for determining whether an oil sample has a flash point below a selected temperature level which comprises a flash chamber, electrical means for heating and maintaining said chamber at the selected temperature level, a sample cup in said chamber, a bellows means in an upper wall portion of said chamber, a spark ignition means within said chamber, an electrical bellows switch actuated by said bellows means, a liquid oil feed inlet to said cup, means for preheating said liquid to a temperature approximating that of said heated flash chamber, an air supply conduit communicating with said flash chamber, a gravity pump connected to said inlet, a funnel means for introducing the liquid oil sample into said feed pump, an auxiliary electrical circuit means, and a relay circuit means actuated by said bellows switch, said relay circuit means controlling the said auxiliary circuit means.

6. An apparatus for determining whether a given oil sample has a safe flash point above a preselected temperature which comprises in combination a frame member supporting a flash chamber, a bellows means forming a wall portion of said chamber, a sample cup and spark ignition means within said chamber, a gravity piston pump supplying liquid oil to said cup, an electrical indicator means controlled by a relay means actuated by said bellows means, an air supply conduit discharging into said flash chamber, a pressure-responsive switch overriding said electrical indicator means and maintained in an operative association by sustained hydraulic pressure produced by the discharge from said gravity pump, and a second pressure-actuated switch overriding the said indicator means and responsive to the continuous flow of air through said air supply conduit.

7. An apparatus for determining whether a given oil sample has a safe flash point above a preselected temperature which comprises in combination a flash chamber, means for controllably heating said chamber, a bellows wall portion in said chamber, a sample cup in said chamber, a spark ignition means above said cup, a gravity piston pump discharging liquid oil to said cup, an air supply conduit discharging into said flash chamber, an electrical flash indicator controlled by a relay means actuated by said bellows means, a first pressure-responsive switch overriding said relay means and maintained in an operative circuit closing association only by sustained hydraulic pressure produced when a minimum sample volume has been discharged from said gravity pump, and a second pressure-actuated overriding switch maintained in an operative position only by continuous flow of air through said air supply conduit, said electrical flash indicator being operable only when both said first and second switches are closed.

8. An apparatus for automatically determining whether a given liquid hydrocarbon sample has a flash point below an allowable minimum temperature comprising means for flowing the sample to be tested into a flash chamber, means for maintaining the flash chamber at a temperature above but approximating the allowable flash point temperature for the liquid under test, drain means for withdrawing liquid from said chamber, means for commingling an oxygen-containing gas with said sample before introduction into said flash chamber, means for applying intermittently an ignition spark to a vapor space above said sample within the flash chamber for an appreciable time, timer means for controlling said intermittent ignition spark in response to the introduction of a sample into said flash chamber, and means for indicating whether an explosion occurs.

9. An aparatus for automatically indicating whether a liquid hydrocarbon sample has a flash point below a selected minimum temperature comprising means for maintaining a quantity of the sample within a flash chamber, drain means for withdrawing liquid sample from said flash chamber, means for commingling an oxygen-containing gas with said sample before introduction into said flash chamber, means for applying intermittently an ignition spark to an upper portion of said flash chamber for a controlled time, means for controllably heating said chamber to a level corresponding to the allowable minimum flash point of the sample, timer means for controlling said intermittent ignition spark in response to the introduction of a sample into said flash chamber, and means for indicating whether a flash occurs during the said controlled time.

10. An apparatus for automatically and continuously ascertaining whether a liquid hydrocarbon sample has a flash point below an allowable minimum temperature comprising means for introducing the liquid to be tested continuously into a flash chamber, drain means for withdrawing liquid from said chamber, means for maintaining the flash chamber at a temperature corresponding to the allowable minimum flash point temperature, means for evaporating at least a portion of the hydrocarbon sample at the maintained temperature within the flash chamber, conduit means for introducing an oxygen-containing gas continuously into said sample, and means responsive to the introduction of the sample for applying intermittently an ignition spark to an upper portion of the flash chamber whereby the occurrence of a flash indicates that the introduced sample has a flash point below the maintained temperature of the flash chamber.

11. An apparatus for automatically indicating whether a hydrocarbon test liquid has a flash point below an allowable minimum temperature comprising in combination a flash chamber, a cup within a lower part of said chamber, conduit means for supplying test liquid to said chamber, means for commingling oxygen-containing gas with said test liquid, means for controllably heating said chamber to a level corresponding substantially to the allowable minimum flash point temperature of the test liquid, intermittently-actuated ignition means in said flash chamber, timer means for controlling said intermittently-actuated ignition means responsive to the flow of test liquid through said conduit means, and means for indicating whether a flash occurs during the said controlled time.

12. An apparatus for automatically indicating whether a hydrocarbon test liquid has a flash point below an allowable minimum temperature comprising in combination a flash chamber, a cup within a lower part of said chamber, conduit means for flowing test liquid through said cup and from said chamber, means for commingling oxygen-containing gas with said test liquid flowing through said cup, means for controllably preheating said test liquid and for heating said chamber to a level corresponding substantially to the allowable minimum flash point temperature of the test liquid, intermittently-actuated ignition means in said flash chamber, timer means for controlling said intermittently-actuated ignition means, means responsive to the presence of test liquid for actuating said timer means, and means for indicating whether a flash occurs during the actuation of said timer means.

13. The apparatus of claim 12 wherein said ignition means includes a sparking coil means exterior of said chamber, and said cup comprises an open-ended cylindrical conduit extending through the bottom of said chamber and being provided with a splash shield at its upper end.

References Cited in the file of this patent

UNITED STATES PATENTS

| 1,861,021 | Martin | May 31, 1932 |
| 2,500,964 | Sullivan et al. | Mar. 21, 1940 |
| 2,627,745 | Matteson | Feb. 10, 1953 |

FOREIGN PATENTS

| 115,140 | Switzerland | June 1, 1926 |
| 583,505 | Germany | Sept. 5, 1933 |